May 1, 1923.
A. H. HEBERT
1,453,673
OIL SHIELD FOR BELT PULLEYS
Filed Oct. 1, 1921
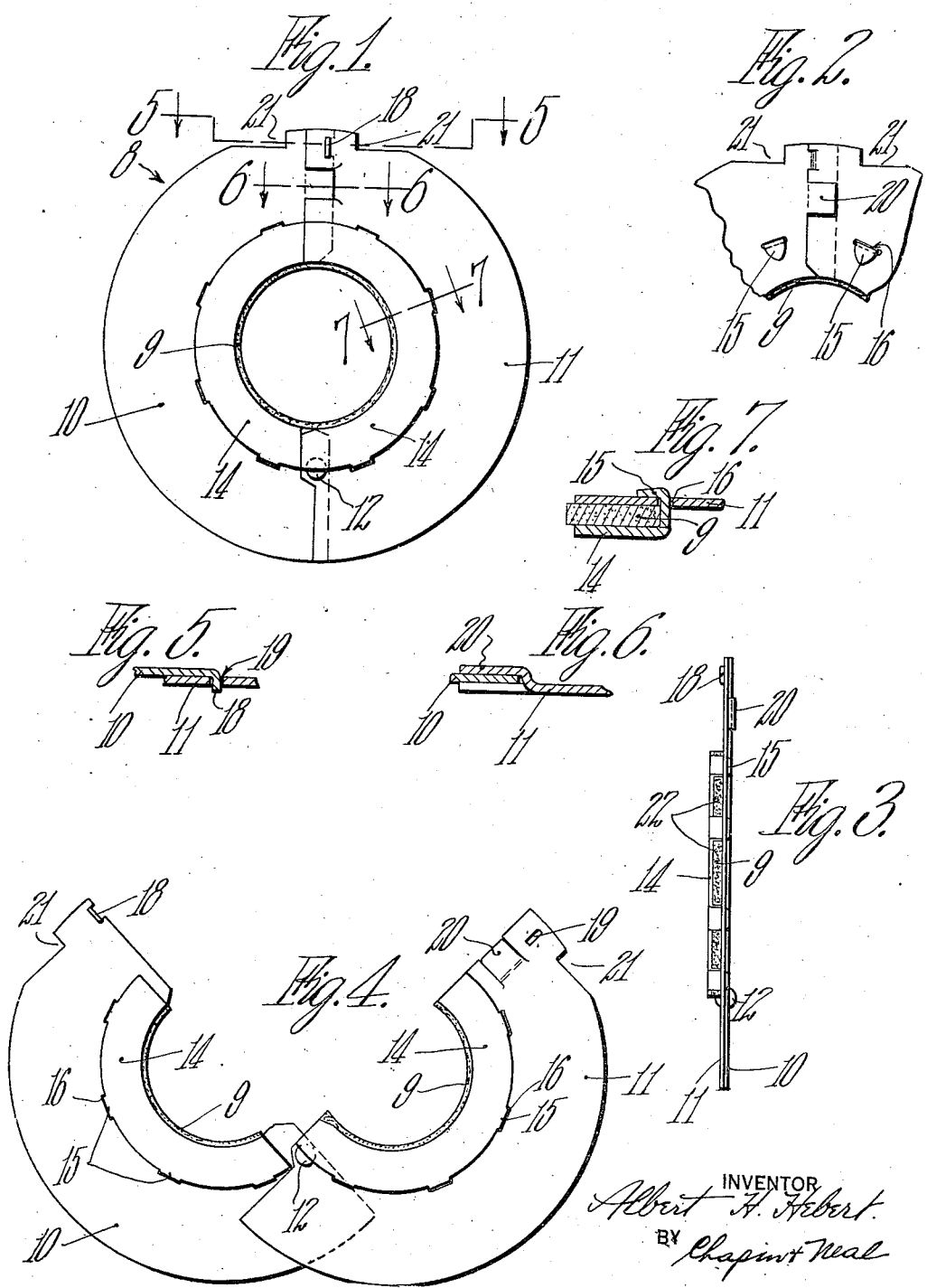
INVENTOR
Albert H. Hebert.
BY Chapin + Neal
ATTORNEYS.

Patented May 1, 1923.

1,453,673

UNITED STATES PATENT OFFICE.

ALBERT H. HEBERT, OF HOLYOKE, MASSACHUSETTS.

OIL SHIELD FOR BELT PULLEYS.

Application filed October 1, 1921. Serial No. 504,622.

*To all whom it may concern:*

Be it known that I, ALBERT H. HEBERT, citizen of the United States, residing at Holyoke, in the county of Hampden and State of Massachusetts, have invented new and useful Improvements in Oil Shields for Belt Pulleys, of which the following is a specification.

The present invention relates to means for preventing a liquid, such as oil, from travelling along a rotating shaft beyond a certain point. More particularly the invention relates to a device in the nature of a shield which is adapted for attachment to the crank-shaft of a Ford car or other automobile, between the engine casing and the fan-belt pulley to protect the latter from the oil which invariably works out of the engine casing and travels along the crank-shaft.

One object of the invention is to provide a device of the character described which shall be of simple and inexpensive construction and which will perform its function efficiently and reliably.

Another object of the invention is to provide means which will not only arrest the flow of oil or other liquid along a rotating shaft, but will cause the oil to be removed from the shaft so as to avoid the undesirable accumulation of oil upon the shaft and the attendant possibility that more or less of the accumulated oil will ultimately penetrate beyond the arresting means.

A further object of the invention is to provide a device of the character described which may be readily and conveniently attached to a shaft or detached therefrom without the necessity of passing it over the end of the shaft or interfering with parts mounted upon the shaft.

Other objects of the invention and the features of construction by which they are attained will appear from the following description of the preferred embodiment thereof illustrated in the accompanying drawings, in which:—

Fig. 1 is a view, in side elevation, of a shield constructed in accordance with the present invention;

Fig. 2 is a fragmentary view of the opposite side of the shield from that shown in Fig. 1;

Fig. 3 is an edge view of the shield;

Fig. 4 is a side elevational view of the shield showing the sections thereof opened up and ready to be attached to a shaft; and Figs. 5, 6 and 7 are detail sectional views taken respectively on the lines 5—5, 6—6, and 7—7 of Fig. 1.

Referring to the drawings, the illustrated oil shield comprises a disk-like device 8 which is adapted, by reason of a central aperture therein, to encircle the crank-shaft of an automobile engine, between the engine casing and the fan-belt pulley and an annular member or washer 9 of absorbent material, such as felt, which is carried by the portion 8 of the shield and is also adapted to encircle the crank-shaft. The above mentioned parts are further so constructed and arranged that when applied to the shaft, the inner peripheral face of the absorbent washer will be in intimate contact with the shaft and the whole device will be rigidly secured to the shaft so as to rotate therewith.

For convenience in applying the shield, it is made in two parts so that it may be readily applied directly to a portion of a shaft intermediate its ends, thus avoiding the necessity of disturbing parts already mounted upon the shaft. As shown, the disk like portion 8 of the shield is formed in two sections 10 and 11 which are pivoted together at 12, and the absorbent washer 9 is split transversely at two points to provide two separated segments one of which is secured to the disk section 10 while the other section of said washer is secured to the disk section 11.

The disk sections 10 and 11 are duplicates, except as hereinafter set forth, and each has a surface area greater than half the surface area of the disk when said sections are assembled, thus enabling the disk sections to overlap one another at diametrically opposite sides of the central aperture therein, as shown in Fig. 1. The overlapped ends of the disk sections 10 and 11, at one side of the central aperture therein receive the pivot means 12 which, as shown, consists of a stud connecting the two disk sections, while the other pair of overlapped ends of the disk sections are provided with interengaging fastening devices hereinafter to be described.

The two segments of the absorbent member or washer 9 are severally secured to the disk sections 10 and 11 by a retaining ring 14 which is also split transversely at two points to form two separated ring segments corresponding to the segments of the absorbent washer which is held thereby.

As shown clearly in Fig. 3, the absorbent washer is frictionally held between the retaining ring 14' and one side of the disklike portion 8 of the shield. To secure the retaining ring 14 to the portion 8 of the shield, the segments of the retaining ring are provided with fastening prongs 15 which project from the outer periphery of said segments, these prongs project substantially at right angles to the planes of the washer segments and extend through apertures 16 in the disk sections, which are provided to receive them. The apertures 16 are arranged in a circle concentric with the peripheral edge of the disk and the free ends of the prongs 16 project beyond the disk at the opposite side from the absorbent washer and are bent over against the face of the disk and toward the inner periphery thereof. It will be noted that while one segment of the absorbent washer 9 and the corresponding segment of the retaining ring 14 is coextensive in length with the length of the inner peripheral edge of the corresponding disk section, the other washer and retaining ring segments are shorter than the corresponding disk section, and are arranged to leave both ends of the associated disk section uncovered for a short distance. This construction permits the desired overlapping of the disk sections 10 and 11 to be effected without correspondingly overlapping the adjacent ends of the washer and retaining ring segments. As shown in Fig. 1, the construction and arrangement is such that when the shield has been applied to the crank shaft and the disk sections have been closed into operative position, the adjacent ends of the washer and retaining ring sections are disposed in abutting relation.

To fasten together the unpivoted ends of the disk sections 10 and 11 when the shield has been applied to a shaft, interengaging fastening devices are provided comprising, in the illustrated embodiment of the invention, a tongue 18 on the disk section 10 and an aperture 19 on the disk section 11 for receiving said tongue. The fastening tongue 18 may conveniently be struck up from the disk section 10 so as to extend at right angles to the face of said section on the side thereof which is to be overlapped by the disk section 11. As shown, the fastening tongue 18 is radially disposed with respect to the center of the disk and the aperture 19 is radially elongated to receive and cooperate with the tongue 18. When the unpivoted ends of the disk sections 10 and 11 have been overlapped and the fastening devices 18 and 19 have been interengaged, the disk sections are secured against any tendency to spread apart in their own plane, and each disk section is obviously held by the other disk section against lateral displacement in one direction. To prevent lateral displacement of said disk sections in the opposite direction, such as would tend to disengage the fastening devices 18 and 19, one of the disk sections (in the form illustrated, the section 11) is provided with a laterally offset lug 20, said lug being arranged to overlap the disk section 10 upon the opposite side thereof from that overlapped by the disk section 11. As the disk sections are closed together around the crank-shaft and the unpivoted ends of said sections overlap one another, the end of the disk section 10 is forced between the offset lug 20 and the non-offset portions at the corresponding end of the disk section 11, and the outer marginal portions at the overlapping ends of the disk sections will be constrained to spring slightly away from each other to permit the tongue 18 to ride across the face of the disk section 11. When the disk sections have been closed to tightly clamp the washer to the shaft, the resiliency of the flexed overlapping portions of the disk sections will cause the tongue 18 to spring into the aperture 19, thus locking the disk sections so as to prevent them from being opened up by an outward swinging movement about the pivot stud 12. When the fastening devices 18 and 19 have been interengaged, the offset lug 20 functions to prevent lateral displacement of either of the overlapping ends of the disk sections in a direction to disengage the fastening devices. To assist in applying the shield to a shaft, peripheral notches 21 may be cut in each of said sections, said notches providing shoulders arranged for engagement by the jaws of pliers or other suitable tool for closing the disk sections around the shaft.

It will be seen that when the pivoted sections of the shield are opened or spread apart, as shown in Fig. 3, the shield may be readily slipped over the side of the shaft to which it is to be applied. When said sections are closed and the fastening devices 18 and 19 are interengaged, the shield appears as shown in Fig. 1 and is rigidly secured to the crank-shaft so as to rotate therewith. The inner peripheral edge of the absorbent washer 9 is then held in intimate contact with the shaft and completely encircles the same.

The shield is secured in place upon the crank-shaft with the side bearing the absorbent washer facing the engine casing so that oil travelling along the shaft from the engine will be absorbed by said washer before reaching the opposite side of the shield which faces the fan belt pulley. Since the shield rotates with the shaft, centrifugal force will tend to draw the oil toward the outer peripheral surface of the washer. In accordance with an important feature of the present invention provision is made for causing the oil held in the absorbent washer to be extracted therefrom and delivered peripherally from the shield thus rendering the absorbent washer capable of absorbing all the oil which may reach it from the shaft and thus effectively preventing any of the oil from reaching the fan belt pulley.

With the above end in view, the fastening prongs 15 are spaced apart so that when the ring 14 is secured in place the outer peripheral edge of the absorbent washer will be exposed except at the spaced points where the prongs 15 extend thereacross. Thus, as shown in Fig. 4, apertures 22 are formed, which alternate with the prongs 15 and through which the oil will be dissipated in minute particles by centrifugal force. The washer is, in effect, enclosed in an annular housing having a series of apertures in its outer peripheral wall to permit the peripheral escape of oil but completely enclosing both sides of the washer. The disk which constitutes one side of the washer housing extends beyond the outer periphery of the washer and serves as a shield to protect the fan belt pulley from the flying particles of oil if any should be deflected in that direction.

In practical use it has been demonstrated that the above described oil shield effectually operates to prevent any oil which may travel along a shaft to which the shield is applied, from passing beyond the shield. When applied to the crank-shaft of an automobile the shield perfectly performs the function of protecting the fan belt pulley from all oil from said shaft. Furthermore the device is of simple and inexpensive construction and is so designed that it may readily be attached to a shaft or detached therefrom without the necessity of disturbing other parts mounted upon the shaft.

While for illustrative purposes the invention has been herein disclosed in what is now considered to be its preferred embodiment, it is to be understood that the construction shown and described may be variously changed and modified and that the scope of the invention is defined by the appended claims rather than by the foregoing description.

What is claimed is:

1. A device of the character described comprising an absorbent washer, a disk, a separate retaining ring, the disk being of greater diameter than the washer and the washer being interposed between the disk and the ring and means on the ring for securing the ring and washer to the disk, the device as a whole being adapted to be fixedly secured upon a shaft with the inner peripheral face of the washer in contact with the shaft, and with the inner peripheral faces of the ring and disk spaced from the shaft.

2. A device of the character described comprising a centrally apertured disk composed of two sections adapted to overlap at substantially diametrically opposite points and pivotally connected at one side of said aperture, an absorbent washer made in two substantially semi-circular segments severally carried by the sections of said disk, the parts being so constructed and arranged that when the disc sections are opened the device may be slipped over the side of a shaft and when said disk sections are closed the washer will encircle the shaft with its inner periphery in contact therewith, and means for securing the disk sections in closed relation.

3. A device of the character described comprising an apertured disk, composed of two sections pivoted together and adapted to be swung apart to open up said apertures, an absorbent washer made in two segments divided along transverse planes, said segments being severally mounted upon the disk sections and having their inner peripheral faces adapted to engage the shaft when the disk sections are swung toward each other, and interengaging fastening devices on said disk sections for securing said sections in closed relation and binding the washer segments against the shaft so that the whole device will rotate with the shaft.

4. A device of the character described comprising an apertured disk composed of two sections pivoted together and adapted to be swung apart to permit the disk to be fitted over a shaft, an absorbent washer made in two segments divided along transverse planes, said segments being severally mounted upon the disk sections and having their inner peripheral faces adapted to engage the shaft when the disk sections are swung toward each other, means for securing the disk sections in closed relation with the washer sections secured to the shaft so that the whole device will rotate therewith, and a shoulder formed in outer periphery of each disk section adapted to be engaged by pliers or the like for the purpose of securing the device to the shaft.

5. A device of the character described comprising a centrally apertured disk composed of two sections adapted to overlap at substantially diametrically opposite points and pivotally connected at one side of said aperture, an absorbent washer made in two substantially semi-circular segments severally carried by the sections of said disk, the parts being so constructed and arranged that when the unpivoted ends of the disk sections are swung apart the device may be slipped over the side of a shaft and when said ends brought together the washer will encircle the shaft with its inner periphery in contact therewith, a laterally offset member on the unpivoted end of one of said disk sections arranged to engage within an opening in the corresponding end of the other disk section, and means offset from one of said ends of the disk sections for overlapping the outer surface of a portion of the corresponding end of the other disk section to prevent lateral displacement of said sections tending to disengage the fastening devices.

6. A device of the character described comprising an absorbent washer adapted to fit closely upon a shaft so as to rotate therewith, a disk apertured to receive said shaft and having said washer secured to one side thereof, means for securing the washer to the disk consisting of a ring between which and the disk the washer is interposed, said ring being adapted to encircle the shaft, and a plurality of prongs projecting laterally from said ring in spaced apart relation and adjacent the outer periphery of the ring, said prongs extending through holes in said disk and being bent over against the outer face of the disk.

7. A device of the character described comprising an absorbent washer adapted to encircle a shaft, and means for partially enclosing the washer and securing it in fixed relation to the shaft with its inner peripheral edge in contact with the shaft, said means being constructed and arranged to expose the outer peripheral edge of the washer to permit the escape of oil from the washer.

In testimony whereof I have affixed my signature.

ALBERT H. HEBERT.